United States Patent
Hohmann et al.

(10) Patent No.: US 11,731,223 B1
(45) Date of Patent: Aug. 22, 2023

(54) LIFTING AND TRANSPORTING DEVICE

(71) Applicants: Frank Hohmann, Warstein (DE); Jörg Hohmann, Meschede (DE)

(72) Inventors: Frank Hohmann, Warstein (DE); Jörg Hohmann, Meschede (DE)

(*) Notice: Subject to any disclaimer, the term of this patent is extended or adjusted under 35 U.S.C. 154(b) by 0 days.

(21) Appl. No.: 18/112,042

(22) Filed: Feb. 21, 2023

(30) Foreign Application Priority Data

Mar. 9, 2022 (DE) ...................... 10 2022 105 559.0

(51) Int. Cl.
  *B23P 19/04* (2006.01)
  *B66F 9/075* (2006.01)
  (Continued)

(52) U.S. Cl.
  CPC ............... *B23P 19/04* (2013.01); *B66F 3/36* (2013.01); *B66F 9/075* (2013.01); *B66F 19/00* (2013.01)

(58) Field of Classification Search
  CPC .......... B23P 19/04; B66F 9/075; B66F 19/00; B66F 3/36; B25B 29/00; B25B 29/02; B66C 9/04
  (Continued)

(56) References Cited

U.S. PATENT DOCUMENTS 4,213,727 A * 7/1980 Lighthipe, Jr. ......... B66C 23/48
  414/420
5,379,814 A * 1/1995 Posly ....................... B67D 3/00
  141/351
(Continued)

FOREIGN PATENT DOCUMENTS

DE 10 2012 009 255 A1 11/2013
DE 10 2019 200 042 B3 3/2020
(Continued)

*Primary Examiner* — Todd M Epps
(74) *Attorney, Agent, or Firm* — McAndrews, Held & Malloy, Ltd.; Michael S. Tomsa

(57) ABSTRACT

In a lifting and transporting device for lifting a load and transporting the load transversely to the lifting direction, for use in manufacturing a screwed flange connection, in order to bring a bolting tool into a bolting position, in which it is in engagement with a screw bolt connection to be tightened or to be released, or into a transport position in which it can be moved out of engagement with a screw bolt connection and can be transported to the next screw bolt connection, wherein the flange extends horizontally in the transport direction, comprising a frame which extends around a load space of specified size for picking up and lifting a load, a holding mechanism for holding the load, wherein the holding mechanism is movable relative to the frame in the lifting direction, and comprising a hoisting device which beside the load space is attached to the frame and is adapted for lifting and lowering the holding mechanism with a load attached thereto, wherein the frame is mounted on a first and a second support bearing whose supporting directions each extend perpendicularly to the transport direction and which have a distance to each other perpendicularly to the transport direction, wherein the first support bearing is designed for abutment against the flange upper side, and wherein at least the first support bearing includes sliding members or rollers which can be shifted or rolled off in the transport direction, the frame includes a first frame portion and a second frame portion, wherein the second frame portion is pivotally mounted on the first frame portion about an axis which extends in the transport direction, the first support bearing is attached to the first frame portion, the holding mechanism is mounted on the second frame portion so as to be shiftable in the lifting direction and is non-pivotably mounted with respect to the second frame portion about an axis extending in the transport direction, and the holding mechanism is (Continued)

configured to non-pivotably hold the load with respect to the holding mechanism about an axis extending in the transport direction.

12 Claims, 5 Drawing Sheets

(51) Int. Cl.
 *B66F 19/00* (2006.01)
 *B66F 3/36* (2006.01)
(58) Field of Classification Search
 USPC .......................................................... 248/647
 See application file for complete search history.

(56) References Cited

U.S. PATENT DOCUMENTS

| | | | |
|---|---|---|---|
| 5,406,996 A * | 4/1995 | Wagner | B67D 3/0083 |
| | | | 141/391 |
| 5,425,614 A * | 6/1995 | Perussi | B67D 3/0029 |
| | | | 141/351 |
| 9,364,946 B2 * | 6/2016 | Hohmann | B66F 19/00 |
| 11,124,399 B2 * | 9/2021 | Hohmann | B66C 9/04 |

FOREIGN PATENT DOCUMENTS

| | | |
|---|---|---|
| JP | 08122479 A | 5/1996 |
| KR | 1020130026039 A | 3/2013 |
| WO | 2016/193297 A1 | 12/2016 |

* cited by examiner

LIFTING AND TRANSPORTING DEVICE

RELATED APPLICATION

The present application claims priority to German Patent Application No. DE 10 2022 105 559.0, filed Mar. 9, 2022, which is hereby incorporated by reference in its entirety.

BACKGROUND

When manufacturing pretensioned screw bolt connections, bolt tensioning cylinders frequently are used in order to apply an exactly defined pretensioning force onto the screw bolts (e.g., large screw bolts from about M16).

The bolt tensioning cylinders either are set over by hand with arms horizontally stretched away from the upper body, which is extremely exhausting. Or a ladder is utilized, in order to be able to grasp the bolt tensioning cylinder from above, which however on the one hand requires the respective fetching and again putting away of the ladder and hence an additional expenditure of time and on the other hand requires a sufficient free space above the bolt tensioning cylinder. What is also conceivable is the use of a crane, which however requires a continuously free space to the top above the screw bolt connections and an extremely high technical expenditure.

Using a ladder can be dangerous and cranes can be expensive and/or difficult to deploy in some situations. To address this, lifting and transporting devices are sometimes used. For example, U.S. Pat. No. 9,364,946, which granted on Jun. 13, 2016, describes a lifting and transporting device for lifting a load and transporting the same transversely to the lifting direction. Such a device can be used to pretension screw bolt connections in flange connections, in which the screw bolt is inserted from below through the through holes aligned with each other in the components to be connected with each other until the bolt head rests against the flange underside of the components to be connected, and a nut is screwed onto the threaded bolt end on the flange upper side by hand until it rests against the flange upper side. A bolting tool is held in the lifting and transporting device above the flange upper side and is positioned above the screw bolt connection to be pretensioned and is then lowered onto the same. After pretensioning the screw bolt connection, the bolting tool is lifted again by means of the lifting and transporting device and shifted to the next screw bolt connection. In another example, U.S. Pat. No. 11,124,399, which granted on Sep. 21, 2021, describes another lifting and transporting device for lifting a load and transporting the same transversely to the lifting direction. Such a device can be used to pretension screw bolt connections in flange connections, in which the screw bolt is inserted from above into the through holes of the flanges to be connected with each other and the nuts on the flange underside are screwed onto the screw bolts by hand.

Despite the advancements to date, an object of the present disclosure is to propose a lifting and transporting device by means of which the manufacture of screwed flange connections can be further simplified.

SUMMARY

The present disclosure relates generally to improved lifting and transporting device, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
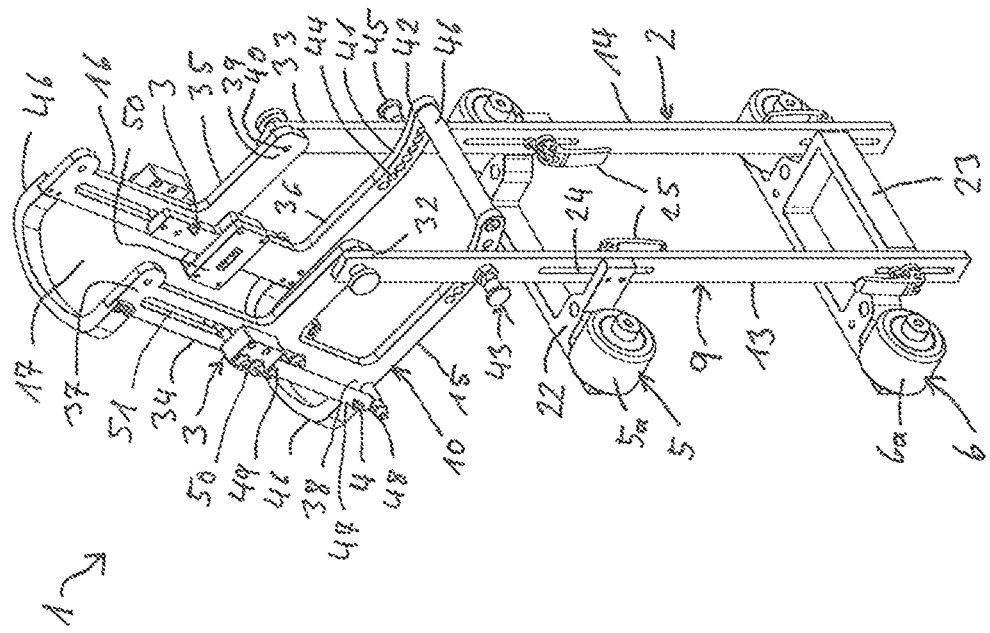
FIG. 1a illustrates a perspective view of a first aspect of a lifting and transporting device according to the subject disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

In the following description, pretensioning a screw bolt connection is understood by those of skill in the art to be both pretensioning free from friction and torsion, in which exclusively a tensile force is applied to the screw bolt and the screw nut subsequently is turned, and rotary pretensioning—e.g., by the torque method or the rotation angle method. Similarly, bolting tools are understood to be both tension-applying bolting tools, e.g., bolt tensioning cylinders, and rotary bolting tools, e.g., torque wrenches or nut runners, wherein the bolting tools can be automatic or also manual bolting tools. Furthermore, a bolting position correspondingly is understood to be an attitude or position of a bolting tool in which the same can pretension a screw bolt connection. Finally, a load space is understood to be the space occupied by the load to be lifted or to be transported.

Using the disclosed lifting and transporting device, tools for pretensioning screw bolt connections can quickly and comfortably be brought in engagement with a screw bolt connection on inclined flanges, and this both on the flange upper side and on the flange underside. Inclined flanges are flanges whose upper side and/or underside are inclined with respect to the horizontal towards the flange outer edge, for example taper towards the flange outer edge in the case of a horizontal separating joint. The screw bolt connections extend either perpendicularly to the flange upper side or perpendicularly to the flange underside and correspondingly are inclined with respect to the vertical.

In some examples, the frame can have two frame portions articulated relative to each other, wherein the joint axis extends in the transport direction, one of the frame portions can be pivoted with respect to the other frame portion such that a bolting tool held on the one frame portion so as to be non-pivotable relative to the same can be aligned with the longitudinal axis of the screw bolt connection, while its weight is dissipated from the other frame portion into the flange upper side by means of the first support bearing. The aligned, inclined bolting tool in this way can be comfortably brought in engagement with the screw bolt connection by shifting along the inclined longitudinal axis of the same, can then be actuated for tightening the screw bolt connection and, after tightening, can also again be separated from the screw bolt connection by shifting, and in the inclined state can then be pushed on to the next screw bolt connection.

Preferably, the first and the second frame portion include arresting elements of an arresting device, by means of which the second frame portion can be arrested with respect to the first frame portion at least at one desired pivot angle. The assembly of inclined screw bolt connections thereby is facilitated considerably, as the fitter on the one hand no longer has to apply any force in order to keep the bolting tool in the inclined orientation, and on the other hand has both hands free to operate the hoisting device and the bolting tool and to push the lifting and transporting device on to the next screw bolt connection. The second frame portion can be pivoted and arrested at several defined angles or steplessly in a specified angular range.

Advantageously, the first frame portion is designed to extend along the flange end face, and the second support bearing is attached to the first frame portion and designed for abutment against the flange underside. With these measures, both the tilt stability of the lifting and transporting device is improved and it is achieved that the lifting and transporting device can be inserted from the flange upper side or from the flange underside without any conversion work for tightening screw bolt connections. A tilting moment about the flange edge, i.e., about an axis parallel to the transport direction, is absorbed by friction forces in the abutment surfaces of the first and second support bearings on the flange upper side and on the flange underside. Furthermore, by rotating the lifting and transporting device about a corresponding horizontal axis, the second frame portion selectively can protrude from the first frame portion at the top or at the bottom, and thus a bolting tool held in the second frame portion can tighten screw bolt connections selectively from the flange upper side or from the flange underside, wherein in the latter case the formerly second support bearing then rests against the flange upper side as first support bearing.

In a favorable development of the subject disclosure, the first support bearing and/or the second support bearing can be shifted along the first frame portion for setting the mutual distance and can be fixed by means of fixing devices. In this way, the lifting and transporting device can be adapted to different flange thicknesses quickly and easily.

Preferably, the second support bearing is attached to the second frame portion and designed for abutment against a component wall rising from the flange above the screw bolt connection. This example provides for an extremely compact configuration of the lifting and transporting device.

In another aspect of the subject disclosure, which likewise is very compact, the second support bearing is attached to the second frame portion and designed for engaging over the screw bolt connections which are adjacent to the screw bolt connection being processed. The second support bearing can be configured as a flat element for engaging over in the form of engaging behind or as a U-shaped element for engaging over in the form of enclosing.

In some examples, the first frame portion can be designed to extend along the flange end face, and the first support bearing is shiftable along the first frame portion from a first position, in which it is arranged when the second frame portion is arranged above the flange upper side, into a second position in which it is arranged when the second frame portion is arranged below the flange underside. With these measures, the two aforementioned examples can also be used to tighten screw bolt connections from the flange underside, wherein in the case of the first-mentioned example the second support bearing is designed for abutment below the screw bolt connection against a component wall extending downwards from the flange.

Preferably, the first support bearing is designed to rest on a horizontal surface portion of the flange upper side. The constructive configuration of the first support bearing thus is simplified considerably. If the second support bearing is provided for abutment against the flange underside, it preferably is designed to rest on a horizontal surface portion of the flange underside. The constructive configuration of the second support bearing also is distinctly simplified thereby.

The horizontal surface portion preferably is arranged between the screw bolt connection and the flange outer edge. In this way, mounting and removing the lifting and transporting device to and from the flange, in particular bringing the first and second support bearings in contact with the horizontal surface portions, is simplified considerably.

In an advantageous example of the subject disclosure, the first frame portion includes guide bolts which are adapted to engage in guiding grooves extending in the transport direction on the flange upper side and/or on the flange underside. The magnitude of the absorbable horizontal forces and hence the tilt stability can thus be increased considerably. These guiding grooves can be formed for example in guide rails mounted on the flange upper side and/or on the flange underside, or can be incorporated into the flange upper side and/or into the flange underside.

Preferably, the hoisting device is attached to the second frame portion. In this way, the constructive configuration of its attachment is simplified, as merely the shiftability in the lifting direction must be taken into account. Otherwise, the attachment of the hoisting device would also have to be configured rotationally movable because of the pivotability of the two frame portions relative to each other.

Figure 1B:
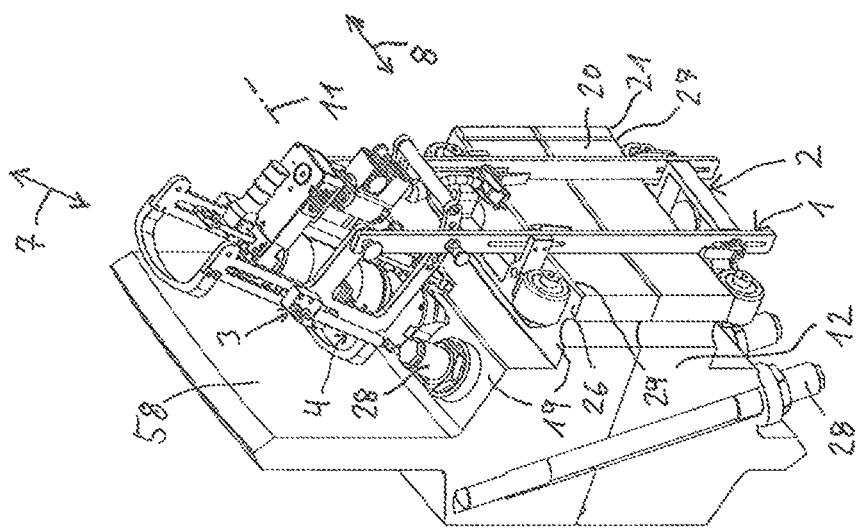
FIG. 1b illustrates a perspective view of the lifting and transporting device of FIG. 1a, used when manufacturing a screwed inclined flange connection.

FIG. 1a illustrates a perspective view of a lifting and transporting device 1 according to the subject disclosure in accordance with a first aspect, while FIG. 1b illustrates a perspective view of the lifting and transporting device 1 of FIG. 1a. The lifting and transporting device 1 can be used when manufacturing a screwed inclined flange connection. As illustrated, a lifting and transporting device 1 according to the subject disclosure as shown in the Figures includes a frame 2, a holding mechanism 3, a hoisting device 4 as well as first support bearing 5 and second support bearing 6. The lifting direction is designated lifting direction 7 and the transport direction is designated transport direction 8.

The frame 2 includes first frame portion 9 and second frame portion 10, which are articulated to each other. The joint axis is a pivot axis 11 about which the two frame portions 9, 10 are pivotable against each other. In the state of the lifting and transporting device 1 mounted on a flange 12, the pivot axis 11 extends in the transport direction 8. The term "flange 12" here refers to a flange connection or pairing comprising an upper flange 12a and a lower flange 12b. The flange 12 can be of linear or ring-shaped design in the form of an inner or outer ring.

Each frame portion 9, 10 is formed of two frame parts 13, 14, 15, 16 that, in the transport direction 8, are arranged before or behind a load space 17 that is designed to receive a bolting tool 18.

The two frame parts 13, 14 of the first frame portion 9 are oblong in shape and designed to extend perpendicularly to the transport direction 8 from the flange upper side 19 along the flange end face 20 to below the flange underside 21. The two frame parts 13, 14 are connected with each other in a deformation-resistant manner by two cross bars 22, 23 extending in the transport direction 8, wherein the cross bars 22, 23 are shiftably mounted on the frame parts 13, 14 in the longitudinal direction of the frame parts 13, 14. For this purpose, longitudinal slots 24 are formed in the frame parts 13, 14, in which the cross bars 22, 23 are mounted. The cross bars 22, 23 can be fixed in their desired position in the longitudinal slots 24 by means of locking devices 25.

On a first cross bar 22 the first support bearing 5 is mounted. It is formed of two support rollers 5a which in the transport direction 8 have a distance to each other and in the condition of the lifting and transporting device 1 mounted on a flange 12 rest on the flange upper side 19. In the illustrated exemplary example, the support rollers 5a are designed to rest on a horizontal surface portion 26 of the flange upper side 19 and roll off on the same in the transport direction 8.

On the second cross bar 23, the second support bearing 6 is mounted. It is likewise formed of two support rollers 6a which have a distance to each other in the transport direction 8. In the condition of the lifting and transporting device 1 mounted on a flange 12, the support rollers 6a rest against the flange underside 21. In the illustrated exemplary example, these support rollers 6a also are designed to rest against a horizontal surface portion 27 of the flange underside 21 and roll off on the same in the transport direction 8.

The horizontal surface portions 26, 27 are arranged between the screw bolt connection 28 and the flange outer edge 29.

As the cross bars 22, 23 are shiftably mounted on the frame parts 13, 14 in the longitudinal direction of the frame parts 13, 14, the support rollers 5a, 6a can be made to abut against the flange upper side 19 or underside 21 by shifting the cross bars 22, 23, and the contact pressure of the support rollers 5a, 6a can also be set. By jointly shifting the cross bars 22, 23 in the same direction, the longitudinal axis 30 of a bolting tool 18 held in the second frame portion 10—when this longitudinal axis 30 extends parallel to the longitudinal axis 31 of the screw bolt connection 28, but not in this longitudinal axis 31—can be shifted into the longitudinal axis 31 of the screw bolt connection 28 in the form of a parallel shift. It is also conceivable that the cross bars 22, 23 are shiftable transversely to the longitudinal direction of the frame parts 13, 14 and thereby transversely to the transport direction 8, i.e., are shiftable horizontally to the transport direction 8 in the state of the lifting and transporting device 1 mounted on a flange 12.

The second frame portion 10 is articulated to the upper end 32, 33 of the frame parts 13, 14 of the first frame portion 9 as shown in FIGS. 1a and 1b. Each frame part 15, 16 of the second frame portion 10 is pivotally attached to a frame part 13, 14 of the first frame portion 9 about the pivot axis 11.

The two frame parts 15, 16 of the second frame portion 10 each approximately have the shape of an inverted F (i.e., ⊣) comprising one longitudinal web 34 each and two transverse legs 35, 36 that are flexurally rigidly connected with the same and extend transversely to the same. The first transverse legs 35 arranged between the two ends 37, 38 of the longitudinal web 34 with their free end 39 each form the joint connection 40 with a frame part 13, 14 of the first frame portion 9, wherein the two joint connections 40 lie on the pivot axis 11.

The second transverse legs 36 each are arranged at the end 38 of the longitudinal web 34 which faces the first frame portion 9. The end region 41 of the second transverse legs 36 each is curved close to their free end 42, wherein the pivot axis 11 forms the axis of curvature and the points of articulation of the joint connections 40 between the first frame portion 9 and second frame portion 10 form the centers of curvature.

To form an arresting device 43, bores 44 are formed in both curved end regions 41, which bores each cooperate with an arresting bolt 45 in the two frame parts 13, 14 of the first frame portion 9 in order to arrest the second frame portion 10 at a desired pivot angle with respect to the first frame portion 9. On arrestment in the last bore in the direction of the longitudinal web 34, this pivot angle is 0°.

The two frame parts 15, 16 of the second frame portion 10 are connected with each other in a deformation-resistant manner by three cross bars 46 extending in the transport direction 8. Each of the ends 37, 38 of the two longitudinal webs 34 as well as the free ends 42 of the second transverse legs 36 are connected with each other by cross bars 46. The cross bars 46 extending between the longitudinal webs 34 are correspondingly shaped to receive the bolting tool 18, in the present case bulged towards the side facing away from the transverse legs 35, 36.

The hoisting device 4 is attached to the longitudinal webs 34. In the illustrated example, it includes a gas pressure spring 47 at each longitudinal web 34, whose first end 48 each is non-displaceably attached close to the second transverse leg 36 and whose second end 49 each is connected to a holding element 50 which is longitudinally shiftably mounted in a longitudinal slot 51 formed in the longitudinal web 34, and both of which jointly form the holding mechanism 3 for holding a bolting tool 18. After tightening/releasing the screw bolt connection 28, the bolting tool 18 is pressured upwards against gravity by means of the gas pressure springs 47. The bolting tool 18 is non-displaceably and non-rotatably, i.e., also non-pivotably, connected to the holding elements 50. For example, it can be screwed to the holding elements 50 or be magnetically or positively held by the same (e.g., by means of a locking bolt). The holding elements 50 in turn are non-pivotably guided in the longitudinal slots 51 with respect to the second frame portion 10 so that by pivoting the second frame portion 10 with respect to the first frame portion 9, the bolting tool 18 is pivoted by the same angle with respect to the first frame portion 9.

The example of a lifting and transporting device 1 according to the subject disclosure as shown in FIGS. 2a to 2d also includes guide bolts 52 in addition to the example as shown in FIGS. 1a and 1b, which are designed to engage in guiding grooves 53 that extend in the transport direction 8 on the flange upper side 19 and flange underside 21, respectively.

In the illustrated example, the guide bolts 52 are mounted on the cross bars 22, 23 in the vicinity of the support rollers 5a, 6a of the first support bearing 5 and second support bearing 6. On the first, upper cross bar 22 the guide bolts 52 are directed downwards for engagement in an upwardly open guiding groove 53 on the flange upper side 19. On the second, lower cross bar 23 the guide bolts 52 are directed upwards for engagement in a downwardly open guiding groove 53 on the flange underside 21.

The guiding grooves 53 for example can be incorporated directly into the flange upper side 19 and into the flange underside 21, wherein the support rollers 5a, 6a directly rest on the flange upper side 19 or flange underside 21, respectively, like in the example as shown in FIGS. 1a and 1b.

Figure 2A:
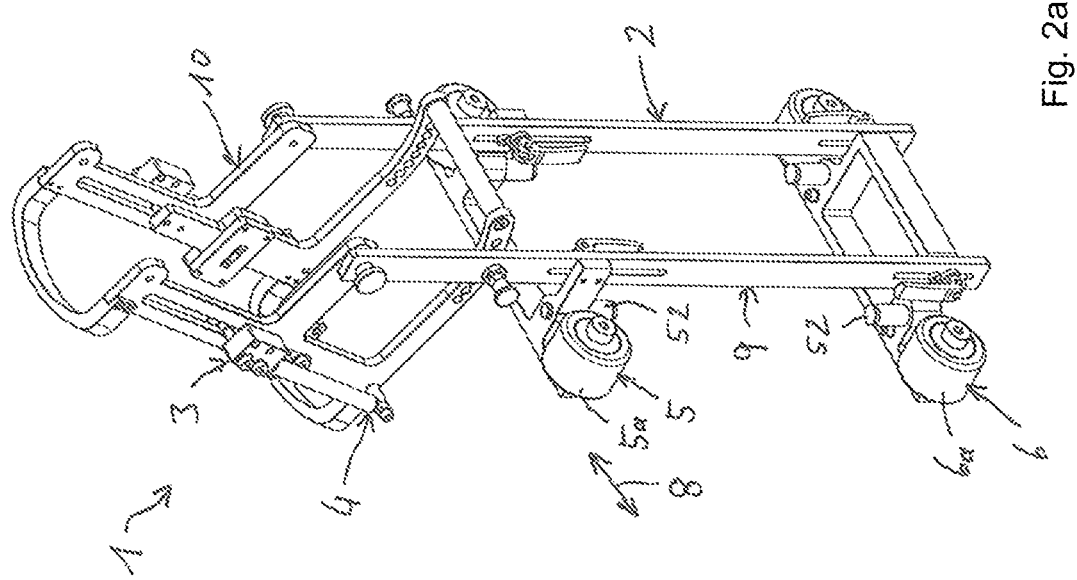
FIG. 2a illustrates a perspective view of a second aspect of a lifting and transporting device according to the subject disclosure.
Figure 2B:
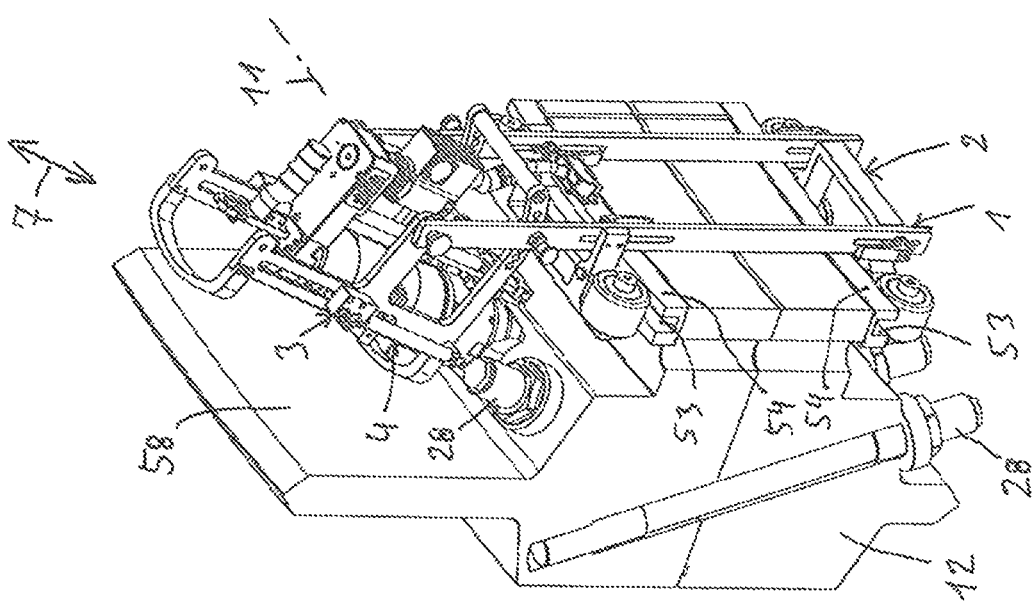
FIG. 2b illustrates a perspective view of the lifting and transporting device of FIG. 2a, used when manufacturing a screwed inclined flange connection.
Figure 2C:
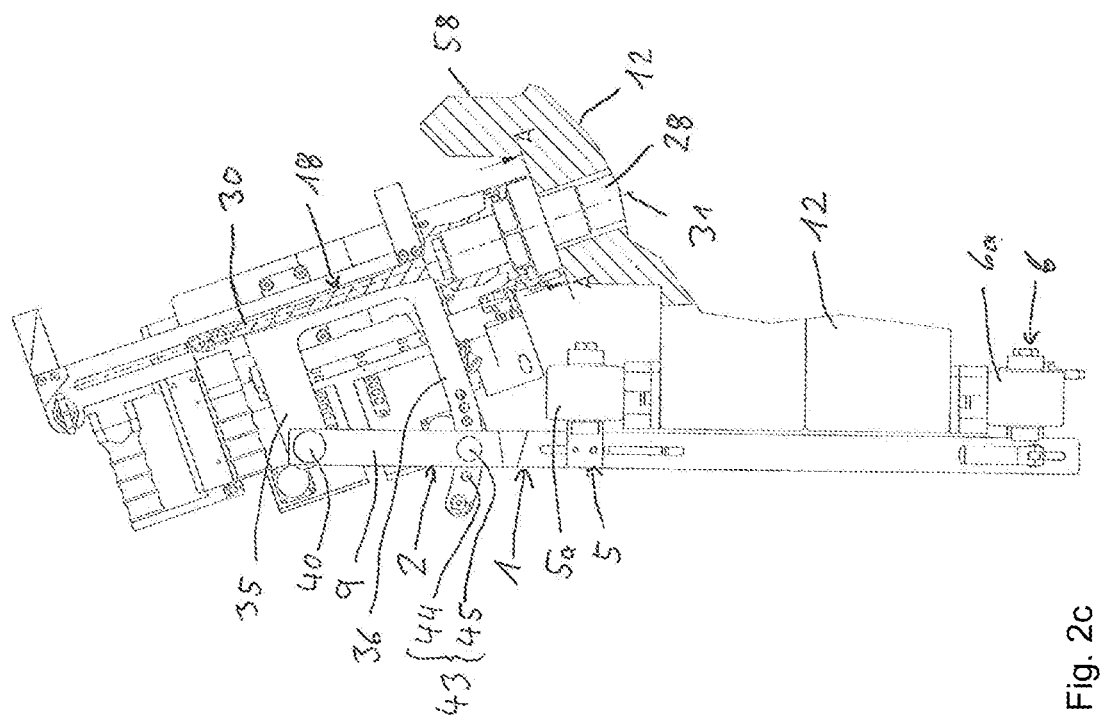
FIG. 2c illustrates a side view of the lifting and transporting device of FIG. 2a with a supported bolting tool, used when manufacturing a screwed inclined flange connection according to FIG. 2b.

FIG. 2a illustrates a perspective view of a lifting and transporting device according to the subject disclosure in accordance with a second aspect, while FIG. 2b illustrates a perspective view of the lifting and transporting device of FIG. 2a, used when manufacturing a screwed inclined flange connection. FIG. 2c illustrates a side view of the lifting and transporting device of FIG. 2a with a supported bolting tool, used when manufacturing a screwed inclined flange connection according to FIG. 2b. Finally, FIG. 2d illustrates a sectional view along line A-A in FIG. 2c.

As shown throughout FIGS. 2a to 2d, the guiding grooves 53 can, however, also be formed for example in guide rails 54, which are temporarily mounted on the flange upper side 19 and on the flange underside 21 for mounting the screw bolt connections 28. In this case, the support rollers 5a, 6a no longer rest directly on the flange upper side 19 or flange underside 21, but on the guide rails 54.

FIG. 2c shows the lifting and transporting device 1 of FIGS. 2a and 2b with a supported bolting tool 18 in the bolting position for tightening a screw bolt connection 28. The frame parts 13, 14 of the first frame portion 9 extend vertically along the end face 20 of the flange 12. The second frame portion 10 is pivoted with respect to the frame parts 13, 14 of the first frame portion 9 by the angle by which the flange upper side 19 is inclined with respect to the horizontal so that the longitudinal axis 30 of the bolting tool 18 corresponds with the longitudinal axis 31 of the screw bolt connection 28.

Figure 2D:
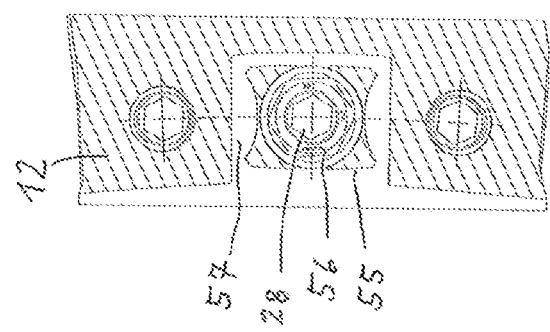
FIG. 2d illustrates a sectional view along line A-A in FIG. 2c.

The section A-A of FIG. 2c, which is best illustrated in FIG. 2d, illustrates a supporting sleeve 55 which is part of the lower part of the bolting tool, rests on the upper side 19 of the inclined flange 12, encloses the nut 56 of the screw bolt connection 28 to be tightened or to be released, and on which the bolting tool 18 is supported on the flange upper side 19 with respect to the flange 12 when the screw bolt connection 28 is tightened/released. The non-hatched surfaces 57 result from the fact that the flange section illustrated in FIG. 2c is the section of an annular flange and due to whose annular curvature a planar cut through the supporting sleeve 55 extends above the flange upper side 19, until it again intersects the flange 12.

The examples shown in FIGS. 1a and 1b as well as 2a to 2d can be used for tightening or releasing screw bolt connections 28 from the flange underside 21 by rotation about a horizontal axis, so that the second frame portion 10 with the supported bolting tool 18 is arranged below the flange underside 21. In this case, the former first support bearing then becomes the second support bearing 6, as it now rests against the flange underside 21, and the former second support bearing becomes the first support bearing 5, as the same now rests on the flange upper side 19. The gas pressure springs 47 then become gas traction springs which pull the bolting tool 18 upwards against gravity for tightening/releasing a screw bolt connection.

Figure 3A:
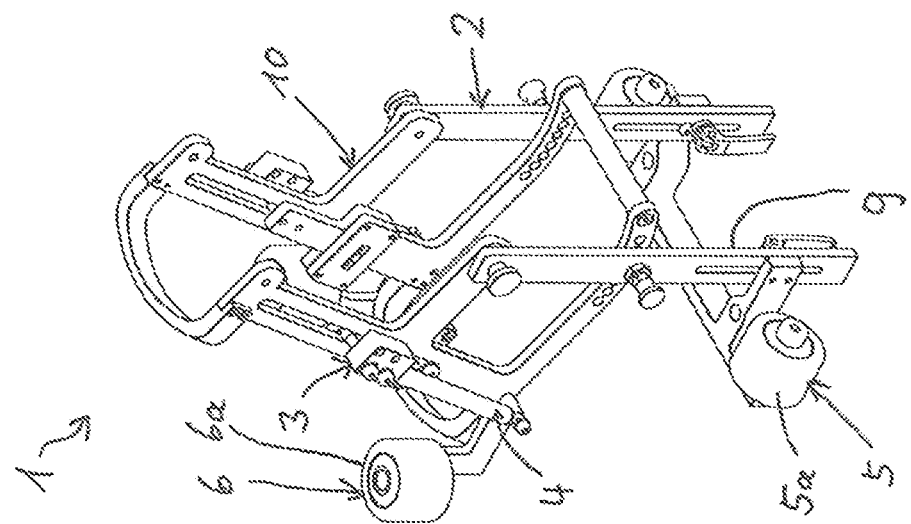
FIG. 3a illustrates a perspective view of a third aspect of a lifting and transporting device according to the subject disclosure.
Figure 3B:
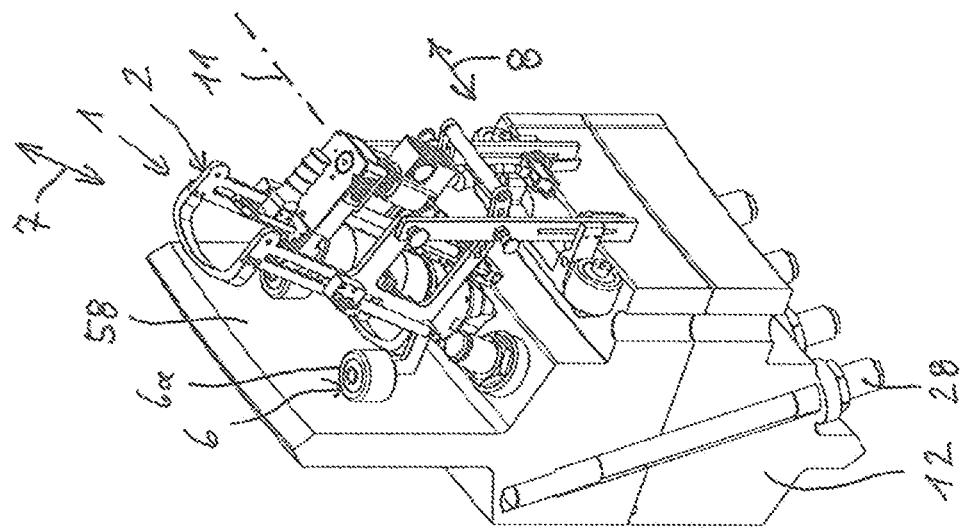
FIG. 3b illustrates a perspective view of the lifting and transporting device of FIG. 3a, used when manufacturing a screwed inclined flange connection.

FIG. 3a illustrates a perspective view of a lifting and transporting device according to the subject disclosure in accordance with a third aspect, while FIG. 3b illustrates a perspective view of the lifting and transporting device of FIG. 3a, used when manufacturing a screwed inclined flange connection. In the example shown in FIGS. 3a and 3b, the second support bearing 6 is mounted on the second frame portion 10 and designed for abutment against a component wall 58 rising from the inclined flange 12. The second support bearing 6 here is also formed of two support rollers 6a; they are each attached to a longitudinal web 34 of a frame part 15, 16, namely at the end 38 at which the second transverse leg 36 also is arranged. The support rollers 6a are shiftably or pivotably attached there, so that their position can be adapted to different pivot angles of the second frame portion 6 and/or to the inclination of the component wall 58 with respect to the vertical.

The first support bearing 5 furthermore is attached to the frame parts 13, 14 of the first frame portion 9 in the same way as in the examples of FIGS. 1a and 1b as well as 2a to 2d, wherein the frame parts 13, 14 only extend along the end face 20 of the flange 12 as far as required for the shiftable attachment of the first support bearing 5.

If such a lifting and transporting device 1 is (also) used for tightening or releasing screw bolt connections 28 from the flange underside 21, the frame parts 13, 14 of the first frame portion 9 are designed to extend along the flange end face 20. The frame parts 13, 14 then each include a longitudinal slot which extends along the entire height of the flange end face 20, so that the first support bearing 5 can be shifted to such an extent that it then also rests on the flange upper side 19 when the lifting and transporting device 1 is rotated by 180° about a horizontal axis, so that the second frame portion 10 with the supported bolting tool 18 is arranged below the flange 12 in order to tighten or release a screw bolt connection 28 from the flange underside 21.

Figure 4A:
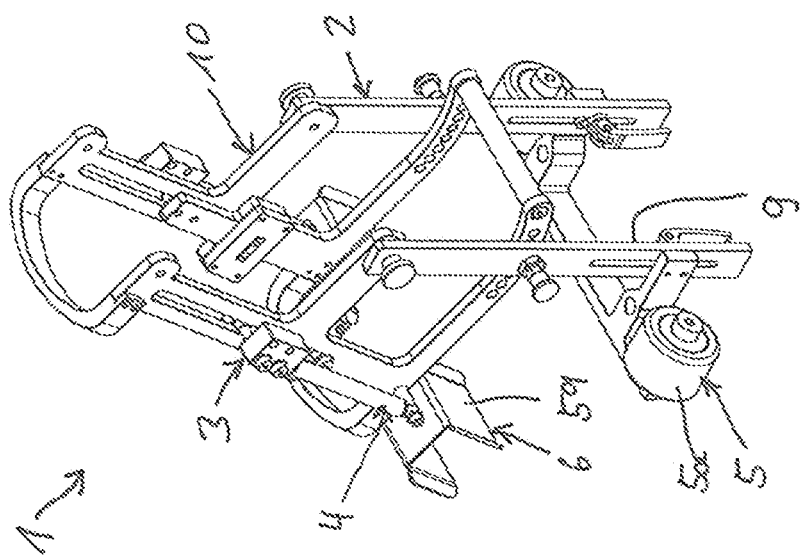
FIG. 4a illustrates a perspective view of a fourth aspect of a lifting and transporting device according to the subject disclosure.
Figure 4B:
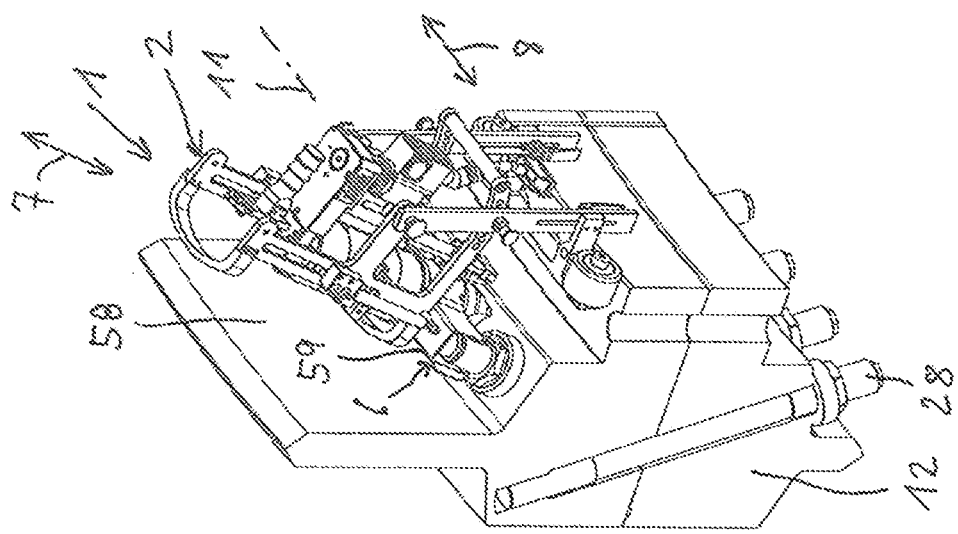
FIG. 4b illustrates a perspective view of the lifting and transporting device of FIG. 4a, used when manufacturing a screwed inclined flange connection.

FIG. 4a illustrates a perspective view of a fourth aspect of a lifting and transporting device according to the subject disclosure, while FIG. 4b illustrates a perspective view of the lifting and transporting device of FIG. 4a, used when manufacturing a screwed inclined flange connection. In the example of FIGS. 4a and 4b as compared to the example of FIGS. 3a and 3b, the second support bearing 6 is configured as a U-shaped element 59 that is designed to engage over the two screw bolt connections located on both sides of the screw bolt connection 28 to be tightened or to be released.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A lifting and transporting device for lifting a load and transporting the load transversely to a lifting direction (7), for use in manufacturing a screwed flange connection in order to bring a bolting tool (18) into a bolting position in which it is in engagement with a screw bolt connection (28) to be tightened or to be released, or into a transport position in which it is out of engagement with a screw bolt connection (28) and can be transported to a next screw bolt connection, wherein a flange (12) extends horizontally in a transport direction (8), the lifting and transporting device comprising:
a frame (2) configured to pick up and lift a load in a load space (17) of a specified size; and
a holding mechanism (3) configured to hold the load, wherein the holding mechanism (3) is movable relative to the frame (2) in the lifting direction (7), the holding mechanism (3) comprising a hoisting device (4) attached to the frame (2) beside the load space (17) and adapted to lift and lower the holding mechanism (3) with the load attached thereto,
wherein the frame (2) is mounted on a first support bearing (5) and a second support bearing (6) whose support directions each extend perpendicularly to the transport direction (8) and which have a distance to each other perpendicularly to the transport direction (8),
wherein the first support bearing (5) is designed for abutment against a flange upper side (19),
wherein at least the first support bearing (5) includes sliding members or support rollers (5a) which can be shifted or rolled off in the transport direction (8),
wherein the frame (2) includes a first frame portion (9) and a second frame portion (10), wherein the second frame portion (10) is pivotally mounted on the first frame portion (9) about an axis (11) that extends in the transport direction (8),
wherein the first support bearing (5) is attached to the first frame portion (9),
wherein the holding mechanism (3) is shiftably mounted on the second frame portion (10) in the lifting direction (7) and is non-pivotably mounted with respect to the second frame portion (10) about an axis extending in the transport direction (8), and
wherein the holding mechanism (3) is adapted to non-pivotably hold the load with respect to the holding mechanism (3) about an axis extending in the transport direction (8).

2. The lifting and transporting device according to claim 1, wherein the first frame portion (9) and the second frame portion (10) include arresting elements (44, 45) of an arresting device (43), by means of which the second frame portion (10) can be arrested with respect to the first frame portion (9) at least at one desired pivot angle.

3. The lifting and transporting device according to claim 1, wherein the first frame portion (9) is designed to extend along a flange end face (20), and the second support bearing (6) is attached to the first frame portion (9) and designed for abutment against a flange underside (21).

4. The lifting and transporting device according to claim 3, wherein at least one of the first support bearing (5) and the second support bearing (6) can be shifted along the first frame portion (9) for setting a mutual distance and can be fixed by means of locking devices (25).

5. The lifting and transporting device according to claim 3, wherein the second support bearing (6) is designed to rest on a horizontal surface portion (27) of a flange underside (21).

6. The lifting and transporting device according to claim 1, wherein the second support bearing (6) is attached to the second frame portion (10) and is designed for abutment above the screw bolt connection (28) against a component wall (58) rising from the flange (12).

7. The lifting and transporting device according to claim 6, wherein the first frame portion (9) is designed to extend along a flange end face (20), and the first support bearing (5) can be shifted along the first frame portion (9) from a first position, in which it is arranged when the second frame portion (10) is arranged above the flange upper side (19), into a second position in which it is arranged when the second frame portion (10) is arranged below a flange underside (21).

8. The lifting and transporting device according to claim 1, wherein the second support bearing (6) is attached to the second frame portion (10) and designed for engaging over the screw bolt connections (59) that are adjacent to the screw bolt connection (28) being processed.

9. The lifting and transporting device according to claim 1, wherein the first support bearing (5) is designed to rest on a horizontal surface portion (26) of the flange upper side (19).

10. The lifting and transporting device according to claim 9, wherein the horizontal surface portion (26, 27) is arranged between the screw bolt connection (28) and a flange outer edge (29).

11. The lifting and transporting device according to claim 1, wherein the first frame portion (9) includes guide bolts (52), which are configured to engage in guiding grooves (53) extending in the transport direction (8) on the flange upper side (19) or on a flange underside (21).

12. The lifting and transporting device according to according to claim 1, wherein the hoisting device (4) is attached to the second frame portion (10).

\* \* \* \* \*